July 22, 1958

W. L. MORSE 2,844,237

TORQUE CONTROL

Filed July 7, 1955

INVENTOR.
WILLIAM L. MORSE
BY
RICHEY, WATTS, EDGERTON & McNENNY

ATTORNEYS

July 22, 1958

W. L. MORSE 2,844,237

TORQUE CONTROL

Filed July 7, 1955

INVENTOR.
WILLIAM L. MORSE
BY
RICHEY, WATTS, EDGERTON & McNENNY

ATTORNEYS

July 22, 1958 W. L. MORSE 2,844,237
TORQUE CONTROL
Filed July 7, 1955 3 Sheets-Sheet 3

INVENTOR.
WILLIAM L. MORSE
BY
RICHEY, WATTS, EDGERTON & McNENNY
ATTORNEYS

2,844,237

TORQUE CONTROL

William L. Morse, Seattle, Wash.

Application July 7, 1955, Serial No. 520,393

4 Claims. (Cl. 192—60)

This invention relates to power transmissions and more particularly to a power transmission in which the relative speed of the output to the speed of the input is continuously variable.

It is the primary object of this invention to provide a transmission having an input element driven by a power supply and an output element supplying power to the load wherein the output torque and the output speed may be continuously varied from the speed and torque of the input to a stationary and no-torque condition either simultaneously or individually as determined by the load condition.

Another object of this invention is to provide a power transmission in which the output torque is continuously variable from no-torque to the input torque.

A still further object of this invention is to provide a power transmission in which the output speed is continuously variable from stationary to the input speed.

Another object of this invention is to provide a power transmission in which a medium such as a fluid, the displacement of which requires work, connects the input element to the output element, the amount of such displacement being controllable and regulating the torque and speed of the output.

The preferred embodiment of my invention includes self-contained fluid which is used in a novel manner as the torque transmitting medium in a variable transmission. The displacement of the fluid is regulated to accomplish the control of the torque and the power being transmitted by means not heretofore used in this manner. The fluid is contained in segmental or unitary chambers which are deformed to cause displacement of the fluid contained therein through restricted passages which builds up a pressure that resists but allows such deformation. By varying the amount of deformation, the amount of resisted flow of the medium is controlled which appears as a concurrent regulation of the torque obtainable at the output.

The speed change in this device between the input and output elements is accomplished without benefit of gearing or sliding friction faces usually found in clutches, couplings and variable speed devices. The input element operating at the speed of the power supply is controllable from a concentric position to eccentric positions as determined by a control element. A follower is carried by the input element through an orbital path without rotation relative to the output element. An anti-friction bearing means intermediate the input element and the follower assures that no appreciable torque will be applied to the follower by the rotation of the input element in the neutral condition.

The peripheral face of the follower engages a flexible container which is integral with the output element. Since the follower is carried in an orbital path when the input element is eccentric the flexible container is continuously deformed to sequentially displace the fluid in succeeding portions of the fluid container against pressure which causes the torque applied to the input element to be transmitted to the output element. Accordingly the amount of work used in displacing the fluid appears as work available at the output element and is available to the load as a driving torque.

In the above described device, the power supply is connected to the orbital member while the power output is connected directly to the fluid containing structure. It is noted however that the power supply may be connected to the element of the device which carries the flexible container and the power output be taken from the eccentric element. This type of operation is desirable when inertia effects would be critical as in the case where rapid and sensitive speed control is desired. It is understood therefore that in the description and the claims either element may be connected to the power supply as determined by the desired operating characteristics.

The coupling device embodying my invention may also be utilized as a brake when desired by applying the torque control in a manner which would deliver the resistance required with the features of adjustability and the lack of a wearing medium predetermined action characteristics could be obtained throughout the life of the brake. Since the operating medium is fluid, the control of the heat is simple and direct.

The coupling device finds considerable utility as a clutch for coupling the prime mover to a machine or for uncoupling as the case may be. The smooth action and absence of sliding friction eliminates such undesirable characteristics as grabbing, screeching and loss of adjustment which are generally found in conventional clutching mechanisms. Further, the device is capable of completely disconnecting the prime mover and delivering no torque to the machine or it may be locked to deliver all of the power and torque to the motor without loss.

Accordingly, it is an object of this invention to provide power transmission in which a medium such as a fluid is self-contained in an element connected to a power supply and a second element, acting on said contained fluid for displacing the fluid against pressure, being connected to the load.

Other objects and advantages more or less ancillary to the foregoing, and the manner in which all the various objects are realized, will appear in the following description, which considered in connection with the accompanying drawings, sets forth the preferred embodiment of the invention.

Figure 1:
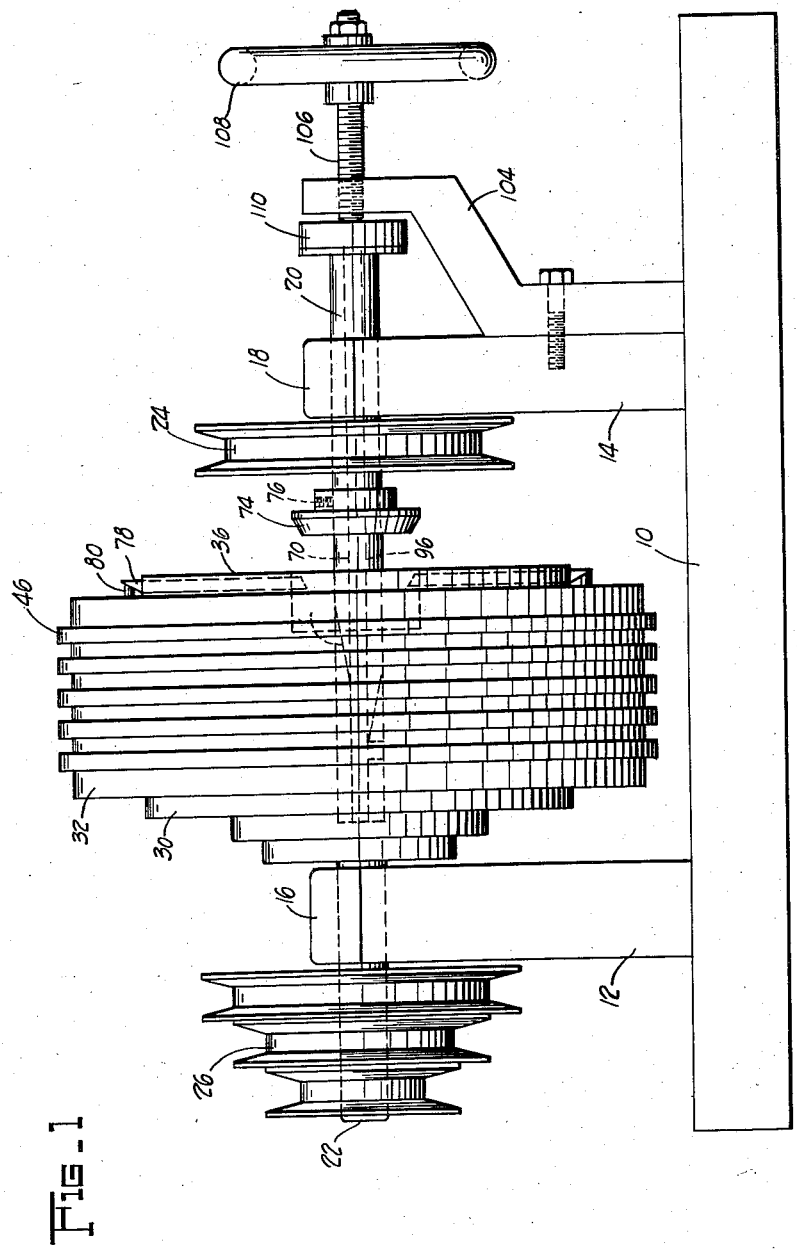
Fig. 1 is an assembly view of a speed and torque control assembly.
Figure 2:
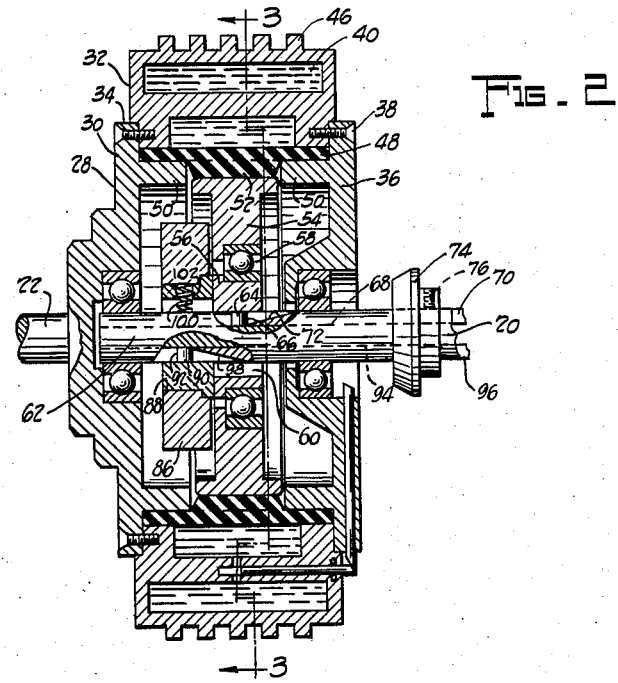
Fig. 2 is a longitudinal sectional view.
Figure 3:
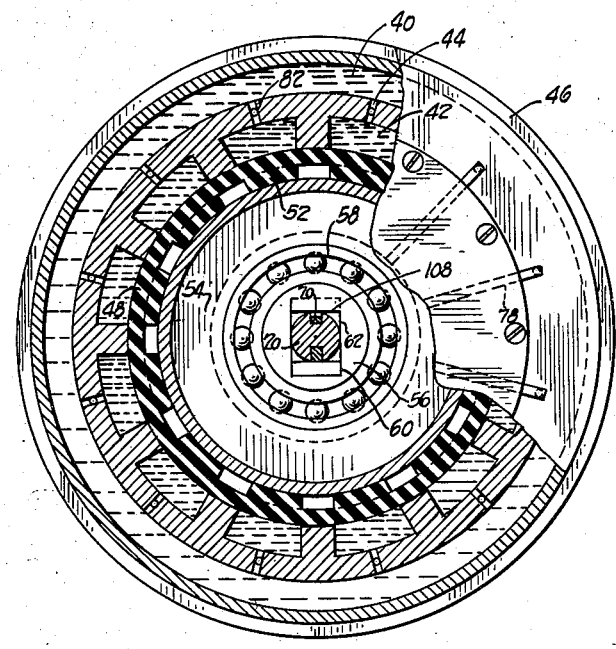
Fig. 3 is a sectional view taken along line 3—3 of Fig. 2.
Figure 4:
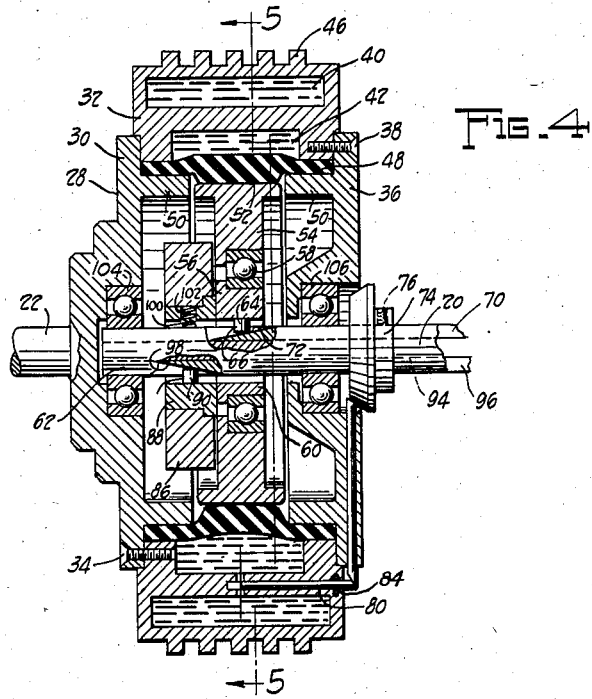
Fig. 4 is a sectional view similar to Fig. 2 showing the eccentric element in a working position.
Figure 5:
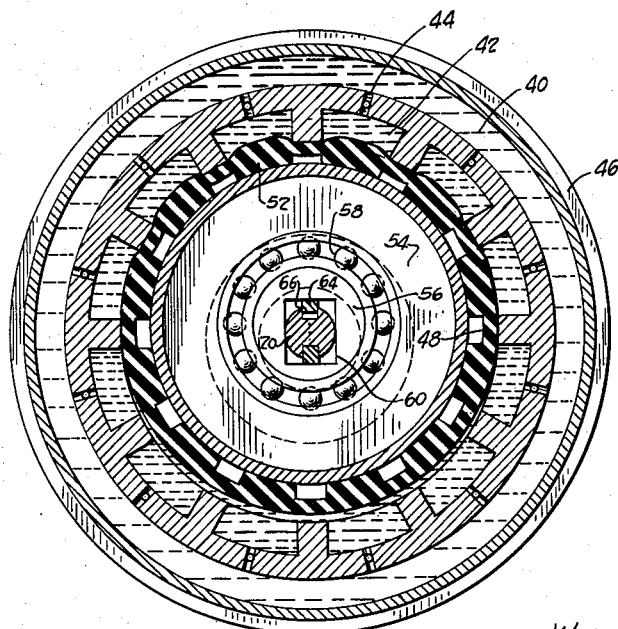
Fig. 5 is a sectional view taken along line 5—5 of Fig. 4.

Referring first to Fig. 1 the speed and torque control assembly shown therein has a base 10 on which pillars 12 and 14 are mounted for carrying pillow block bearings 16 and 18. A shaft 20 is rotatably carried by the bearing 18 and a shaft 22 is rotatably carried by the bearing 16. A pulley 24 is mounted on the shaft 20 to form a driving connection to the shaft 20 which may function either as the input or output of the device. A pulley 26 is mounted on the shaft 22 to provide a driving connection which would be the output drive when the pulley 24 is utilized as the input and the pulley 26 would be the input connection when the pulley 24 functioned as the output.

The shaft 22 is affixed to one side of a housing 28 which forms an enclosed chamber for the operating mechanism of the coupling device. An end plate 30 is joined to an outer ring 32 by a plurality of bolts 34 and an end plate 36 is joined to the outer ring 32 by a plurality of bolts 38.

An annular chamber 40 is disposed adjacent to the outer ring 32 for containing a fluid which is the operating medium of the coupling. A plurality of cavities 42 opening radially inwardly are in communication with the chamber 40 through an orifice 44 for each cavity 42. The orifice 44 allows the flow of fluid from the cavity 42 with which it is associated to and from the chamber 40 as required by the operation of the device. Ribs 46 on the periphery of the ring 42 enhance the heat transfer from the fluid, in order to dissipate the heat developed in the operating condition where a large difference of speed exists between the input and the output.

A cylindrical, flexible diaphragm 48 is affixed to the inner wall of the ring 32 in such a manner as to close the cavities 32 with one flexible wall. Clamping rings 50 are positioned to apply pressure on the portions of the diaphragm adjacent the plates 30 and 36 to position and support the diaphragm 48 against the pressure developed in the cavities 42 when the diaphragm 48 is deflected. The diaphragm 48 has a rib 52 opposite each cavity 42 which is engaged by a follower ring 54. The follower ring 54 is held against rotational movement by friction between the surface thereof and the diaphragm 48 and functions only to apply radial force to the ribs 52 and the diaphragm 48 when moved out of its central position.

The follower 54 is rotatably mounted on an eccentric disc 56. A ball type anti-friction bearing 58 is disposed between the disc 56 and the follower 54 to accommodate for the relative rotation therebetween. The disc 56 has an axial rectangular aperture 60 formed therein for receiving a square section 62 on the shaft 20. The rectangular shape of the aperture 60 allows the disc 56 to be shifted to one side of center to an eccentric position relative to the rotational axis of the shaft 20. When the disc 56 is so displaced the bearing 58 and the follower ring 54 are displaced accordingly which results in the deformation of the diaphragm 48.

A pin 64 is located in a lateral bore 66 in the square section 62 of the shaft 20 and engages the inner wall of the aperture 60. A groove 68 formed longitudinally in the shaft 20 and intersecting the center line of the bore 66 receives a rectangular rod 70 which has a cam surface 72 to engage the pin 64 and displace the pin 64 radially accordingly, thus actuating the eccentric disc 56 into an eccentric position which is related to the position of the rod 70.

A cam plate 74 is adjustably affixed to the rod 70 by a set screw 76 and is slidably carried along the shaft 20 by movement of the rod 70. The cam plate 74 engages and actuates radially a plurality of followers 78, there being a follower 78 for each of the orifices 44. A pin 80 shiftable in a bore 82 which intersects the center line of the orifice 44 operates as a valve when shifted into the orifice closing position. When rod 70 is moved inwardly, the cam plate 74 engages the follower 78 and the pin 80 is moved so that the end thereof travels beyond the orifice 44 and flow therethrough is cut off. Under this condition the flow of fluid from the cavity 42 to the chamber 40 is prevented and further deformation of the diaphram 48 can not occur. When the orifice 44 is closed, therefore, a relative movement of the disc 56 in the eccentric position is impossible which results in the coupling device being locked. An O-ring seal 84 is provided around the pin 80 to prevent leakage of the fluid contained in the device to the outside of the housing 28.

A counter balance weight 86 is mounted on the shaft 20 for equalizing the unbalance resulting from shifting the follower 54 into an eccentric position. The weight 86 is mounted on an eccentric disc 88 similar to the eccentric disc 56 but disposed to be displaced in a direction opposite to the displacement of disc 56. A pin 90 located in a bore 92 formed in the shaft 20 engages the inner surface of disc 88. A longitudinal groove 94 is formed opposite to the groove 68 and intersects the bore 92. A cam rod 96 is disposed in the groove 94 and has a cam surface 98 formed thereon which engages and actuates the pin 90 upon longitudinally inward movement of the rod 96. By actuating the rod 96 and 70 simultaneously, the counter balance weight 86 will be displaced off center in an amount equal to the follower 54, thus achieving a static balance under all conditions of operation. A spring 100 has one end located in a recess 102 formed in the disc 88 and has the other end bearing against the shaft 20 for returning the weight 86 to the neutral or center position when the cam rod 96 is retracted.

A bracket 104 is affixed to the pedestal 14 and has a threaded bore which receives a threaded shaft 106. A hand wheel 108 is affixed to the shaft 106 in order that the shaft 106 may be manually rotated as required for adjusting the device. A thrust bearing 110 is slidable on the shaft 20 and keyed to the rods 70 and 96. Upon rotation of the hand wheel 108, the thrust bearing 110 is urged inwardly with the result that rods 70 and 96 cam the disc 56 into an eccentric position which causes the device to deliver torque. It is noted that such torque is proportional to the degree of adjustment applied by the hand wheel 108.

What I claim and desire to secure by Letters Patent is:

1. A variable speed coupling having input and output elements, said coupling comprising a fluid containing means operably connected to one of said elements, said fluid containing means having a flexible wall confronting separate portions connected by restricted passages for supplying fluid to said portions, variable eccentric means connected to the other of said elements and engaging the flexible wall for continuously deforming succeeding portions of said fluid containing means, and control means for positioning said eccentric means for regulating the speed at the output.

2. A variable speed drive comprising input and output elements, a plurality of fluid chambers connected to one of said elements, a fluid reservoir associated with said chambers, a restricted passage between each of said chambers and said reservoir for supplying fluid to said chambers, a flexible wall on each of said chambers, and rotatable drive means connected to the other of said elements shiftable to an eccentric position and engaging said flexible walls for deforming said walls as determined by the degree of eccentricity of said drive means.

3. A variable speed drive comprising input and output elements, a plurality of fluid chambers connected to one of said elements, a fluid reservoir associated with said chambers, a restricted passage between each of said chambers and said reservoir for supplying fluid to said chambers, a flexible wall on each of said chambers, rotatable drive means connected to the other of said elements, shiftable to an eccentric position and engaging said flexible walls for deforming said walls as determined by the degree of eccentricity of said drive means, and valve means for closing said passages when said drive means has been shifted to a predetermined degree of eccentricity.

4. A variable speed drive comprising input and output elements, a plurality of fluid chambers connected to one of said elements, a fluid reservoir associated with said chambers, a restricted passage between each of said chambers and said reservoir for supplying fluid to said chambers, a flexible wall on each of said chambers, rotatable drive means connected to the other of said elements shiftable to an eccentric position, and follower means driven by said drive means engaging said flexible walls for deforming said walls as determined by the degree of eccentricity of said drive means.

References Cited in the file of this patent

UNITED STATES PATENTS

| 1,840,099 | Houseman | Jan. 5, 1932 |
| 1,840,268 | Williams et al. | Jan. 5, 1932 |
| 2,497,867 | Cymmer | Feb. 21, 1950 |
| 2,575,398 | Schroeder | Nov. 20, 1951 |
| 2,695,694 | Seinfeld | Nov. 30, 1954 |

FOREIGN PATENTS

| 900,531 | Germany | Dec. 28, 1953 |